J. H. WAGENHORST.
VEHICLE WHEEL RIM.
APPLICATION FILED MAR. 14, 1911.
1,085,772.
Patented Feb. 3, 1914.
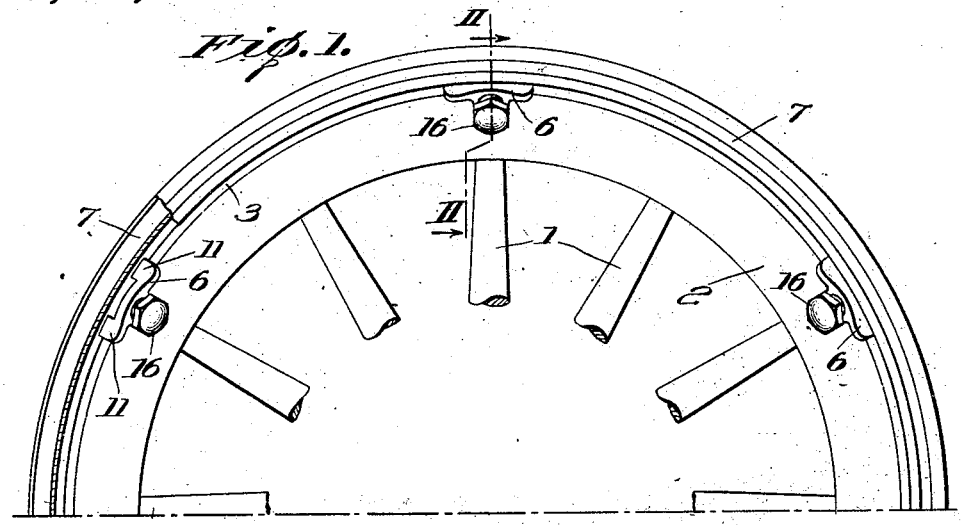
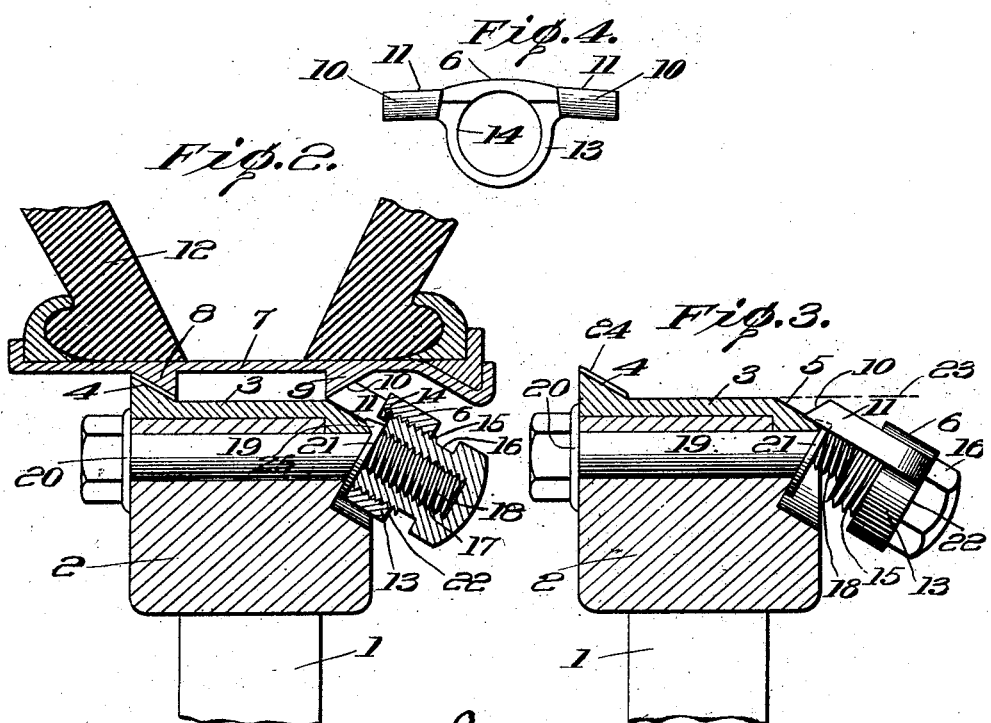

UNITED STATES PATENT OFFICE.

JAMES H. WAGENHORST, OF AKRON, OHIO, ASSIGNOR, BY MESNE ASSIGNMENTS, OF TWO-FIFTHS TO THE B. F. GOODRICH COMPANY, OF NEW YORK, N. Y., A CORPORATION OF NEW YORK, ONE-FIFTH TO THE GOODYEAR TIRE & RUBBER COMPANY, OF AKRON, OHIO, A CORPORATION OF OHIO, AND ONE-FIFTH TO THE UNITED STATES TIRE COMPANY, OF NEW YORK, N. Y., A CORPORATION OF NEW YORK.

VEHICLE WHEEL-RIM.

1,085,772.

Specification of Letters Patent.

Patented Feb. 3, 1914.

Application filed March 14, 1911. Serial No. 614,357.

*To all whom it may concern:*

Be it known that I, JAMES H. WAGENHORST, a citizen of the United States, residing in the city of Akron, county of Summit, and State of Ohio, have invented certain new and useful Improvements in Vehicle Wheel-Rims, of which the following is a specification.

My invention relates to vehicle wheel rims, and particularly to that class of rim designed for use in automobile service in which a resilient tire is carried by a detachable tire-carrying rim and wedges are provided for removably mounting the tire and tire-carrying rim upon a rim or felly band permanently secured to the felly of the wheel. The rims of this type hitherto used have been objectionable in that there was danger of loss of the wedging means used to mount the tire-carrying rim upon the fixed rim.

My invention provides a structure realizing the advantages of the wedge-fastening type of rim together with certain further advantages in construction and operation hereinafter fully described.

In the accompanying drawings which form a part of this specification, Figure 1 is a side elevation of a portion of a vehicle wheel equipped with my new device, parts being broken away; Fig. 2 is a transverse sectional view taken on line II—II of Fig. 1; Fig. 3 is a view similar to Fig. 2, parts being shown in full, with the wedge retracted from engagement with the tire-carrying rim and the felly band; Fig. 4 is a side elevation, looking outwardly, of the wedge member.

Referring to the drawings in detail, the numeral 1 designates a vehicle wheel having the felly 2 upon which is permanently mounted the felly band 3 having the upwardly inclined flange 4 at the inner edge thereof, and the downwardly inclined portion 5 at the outer edge. Upon the flange 4 and the wedge member 6 is mounted the tire-carrying rim 7 having inclined portions 8 and 9 engaging, respectively, the flange 4 and the inclined surfaces 10 of the wedge portions 11 of the wedge member. The rim 7, which may be of any of the well-known clencher or "quick-detachable" types of tire-carrying rims, supports the tire 12, which may be of either the extensible or non-extensible bead type. The inclined surface of the flange 4 is preferably provided with a series of spaced low projections 24 or "lands", as I prefer to call them. There may be a number of these lands, equal to the number of wedge members 6, and they may be located either opposite the wedge members or staggered with relation to the latter. If desired, more lands than wedge members may be used. I prefer to make the lands about one-thirty-second of an inch in height, though they may be made considerably higher than this, and in some cases may be made even lower. These lands have the function of permitting the rim to seat in fixed position upon the felly band, although there may be slight inaccuracies of dimension between the two. In the manufacture of rims on a commercial scale, it is not found practicable to produce rims of an absolutely uniform size, and the free interchangeability of rims is insured by the use of these lands. This is due to the fact that although a rim may be slightly under-size, if it be supported at spaced points, its resiliency will permit it to straighten out slightly between the points of support and thus move to the same place upon the inclined wedging surface of the felly band that a slightly larger rim would occupy. The spaced wedge members 6, engaging the other side of the rim at intervals, have the same effect as the spaced lands 24, and thus these wedge members may be forced to the desired predetermined position and the rim firmly seated upon the felly band. The lands being low, as described, the bearing surface on the rim will normally engage the inclined bearing surface 4 of the felly band between adjacent lands, the area of contact being greater or less, depending on the closeness of fit of the rim and the tension to which it is subjected in forcing it into the desired lateral position on the wheel. In any case the surface 4 between the lands forms a support for the rim in case it is subjected to abnormal shocks or stresses and thus prevents the distortion of the rim beyond its elastic limit.

I do not claim the use of lands broadly in this application, as the same forms the subject-matter of my application Serial Number 614,356, filed March 14, 1911, but I claim in this application only the use of lands for supporting one side of the rim in combination with wedges for supporting the other side thereof. I do not, however, wish to limit the appended claims, which are directed to these lands, to include the particular form of wedge member illustrated, which forms the subject of other of the claims herein, as any of the well-known types of wedges may be used in connection with the felly band provided with lands to advantage.

The wedge member comprises the double wedge portions 11 joined by the flange 13 which is internally threaded at 14. Engaging the threads 14 are the threads 15 of the externally threaded portion of the nut member 16, the internally threaded portion 17 of which engages the threads on the downwardly inclined section 18 of the bolt 19 passing through the felly and clamped rigidly thereto by the lock-nut and washer 20 and the shoulder or flange 21 formed adjacent to the threaded section of the bolt. The axis of the inclined portion of the bolt is substantially parallel to the outer surface of the flange 5 on the felly band.

The internal and external threads on the nut member 16 are opposed to each other in pitch, that is, if one is a righthand thread, the other is a lefthand thread. Preferably I make the thread on the bolt, and consequently the internal thread of the nut member, a righthand thread, and the external thread on the nut member a lefthand thread. If then the nut member is rotated in a righthand direction it will ride inwardly and upwardly upon the bolt. At the same time the wedge member, because of the difference in the direction of the pitch of the threads, will also move upwardly and inwardly upon the nut member, and therefore will progress at a faster rate than the nut member.

The head of the nut 16 I preferably make larger than the externally threaded portion 15 in order to prevent the wedge member from being removed accidentally from the wheel, for, when the nut is rotated in a counter-clockwise direction, the wedge member will ride outwardly and downwardly until the surface 22 of the flange 13 reaches the nut-head, when it will jam, and be prevented from further movement, as the wedge portion is still in engagement with the inclined surface of the felly band. It is, therefore, impossible to remove the wedge member from the wheel without removing the bolt from the felly. The wedge-member is preferably so placed upon the nut 16 that the inner end of the latter will engage the flange 21 when the wedging faces 10 have been forced with the proper degree of pressure against the rim. Further movement of the wedges is thus prevented and the uniform positioning of the several wedges is thus assured. It is, therefore, impossible to mount the rim eccentrically upon the felly band by forcing in the wedges at one side more than the wedges at the other, as may occur where no means for positively limiting the inward movement of the wedges is provided. The engagement between the face of the nut 16 and the flange 21 also causes the nut to act as a jam or lock-nut and prevents the accidental loosening of the wedge-member carried thereby. The position of the wedge member upon the nut 16 may be adjusted by unscrewing the nut 20 and withdrawing the bolt 19 from the felly sufficiently to permit the wedge portions 11 to clear the inclined surface 5 on the felly band. The wedge-member may then be rotated about the nut 16 for one or more turns in either direction, thus adjusting the initial position of the wedge-member upon the screw-threaded portion of the nut.

The shoulder or flange 21 forms primarily an abutment to be drawn up to the side of the felly so that the bolt can be clamped fast to the felly by the nut 20. As it is inclined to the axis of the bolt it also holds the bolt from turning. It is also preferably made to engage the edge of the felly band. so as to assist in holding the latter in position and for the latter purpose it is preferably provided with a lip 25 adapted to overhang the edge of the felly band. This lip also assists in holding the bolt against rotation.

To remove the tire-carrying rim and tire as a unit, it is only necessary to rotate the nut 16 in a counter-clockwise direction for a few turns in order to retract the wedge-member downwardly and outwardly until it recedes below the line of the bottom of the tire-carrying rim, indicated by the broken line 23, thereby permitting the tire and tire-carrying rim to be slipped over the wedge-member and free from the wheel. To mount a tire and rim upon the wheel, this operation is reversed, the tire and rim first being slipped over the wedge in its retracted position, the wedge then being screwed up into engagement with the inclined surface of the bottom of the tire-carrying rim.

It is to be noted as a distinct advantage inherent in my rim that the proportions may readily be made such that the wedge and nut-member will be within the plane of the outer edge of the tire-carrying rim when in operative position, and thus will be protected from contact with the curb or other obstacles along the road.

While I have illustrated and described one specific embodiment of my device, my invention is susceptible of broad application and I do not wish to be limited to the particular structure shown.

Having thus described my invention, I claim:

1. The combination with a vehicle wheel having a surface at one edge thereof inclined to the plane of the wheel, of a detachable rim superimposed upon said wheel, a wedge member for detachably securing said detachable rim to the wheel, and means for forcing the wedge member positively to advance and recede along said inclined surface, said means including a bolt passing through the felly of the wheel and a nut screwing on said bolt and engaging said wedge member, and a stop on said nut for preventing the detachment of said nut from said bolt and said wedge member from said nut.

2. The combination with a vehicle wheel of a detachable rim superimposed upon said wheel, and means for detachably securing said detachable rim to the wheel including a screw-threaded member projecting from said wheel, an internally and externally threaded nut member screwing on said threaded member and having a head larger than the external diameter of the barrel of the nut member, and a wedge adapted to be forced between said rim and wheel, said wedge screwing on said barrel of the nut member.

3. The combination with a vehicle wheel of a removable rim and means for detachably mounting said removable rim upon said wheel including a bolt passing axially through the felly of the wheel and having a shoulder or flange engaging the side of said felly, a screw-threaded portion extending beyond said flange and a wedge member riding on said screw-threaded extension and adapted to be forced into wedging engagement between said wheel and removable rim.

4. The combination with a vehicle wheel, of a removable rim, and wedging means for detachably mounting said removable rim upon said wheel including a bolt having a portion passing axially through the felly of the wheel, and a threaded portion inclined to the plane of the wheel, a wedge member riding upon said inclined portion of said bolt, and a shoulder or flange between the axial and threaded portions of the bolt for limiting the inward movement of said wedge member.

5. The combination with a vehicle wheel having an inclined bearing surface at one side thereof, said surface being provided with a series of circumferentially spaced low projections or lands, of a tire-carrying rim removably mounted on said wheel and supported at one side upon said lands, said lands being of such height as to permit the rim to engage the inclined bearing surface of the wheel between adjacent lands, and wedges secured to the wheel supporting the other side of said rim.

6. In a vehicle wheel, in combination, a felly, a felly band permanently secured thereto and having at one side thereof a flange provided with an outwardly inclined bearing surface, said surface being provided with circumferentially spaced low projections or lands, a tire-carrying rim supported at one side by said lands, said lands being of such height as to permit the rim to engage the inclined bearing surface of the wheel between adjacent lands, and a plurality of circumferentially spaced wedges for supporting the other side of said rim, and means for forcing said wedges into the space between said felly band and the inner surface of said rim.

7. In a vehicle wheel, in combination, a wheel member having a felly, and a fixed rim mounted thereon, a removable rim, and wedging means for detachably mounting said removable rim upon said fixed rim, including a bolt passing axially through the felly of the wheel, and having a shoulder or flange engaging one side of said felly and a removable nut attached to the end of said bolt opposite to said flange and engaging the other side of said felly, said bolt having a downwardly inclined threaded portion projecting beyond said flange, and a wedge member riding on said inclined portion and lying wholly within the line of the inner edge of the removable rim when moved along said inclined portion to inoperative position.

JAMES H. WAGENHORST.

Witnesses:
   Edmund Quincy Moses,
   Eugene C. Bond.